UNITED STATES PATENT OFFICE.

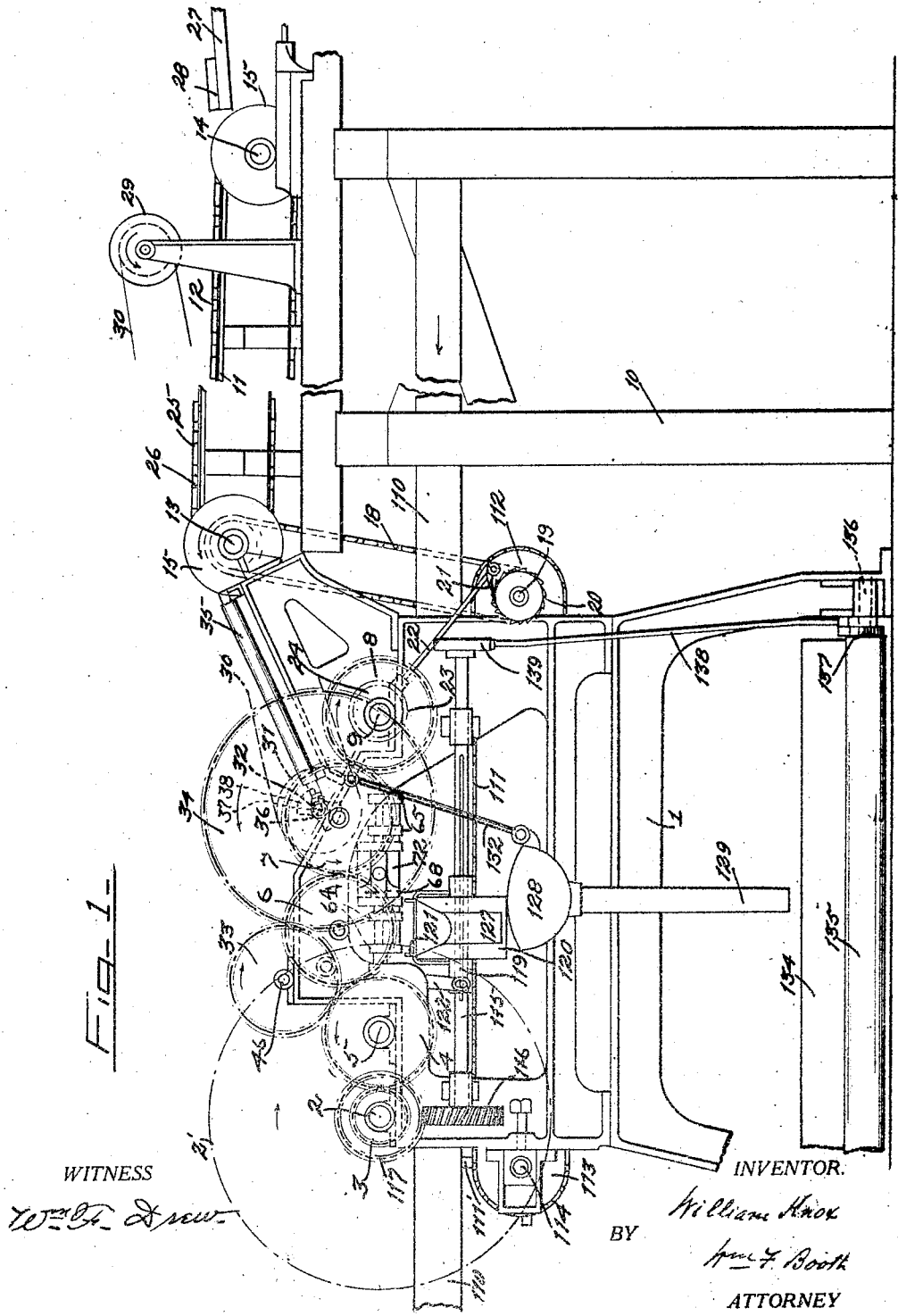

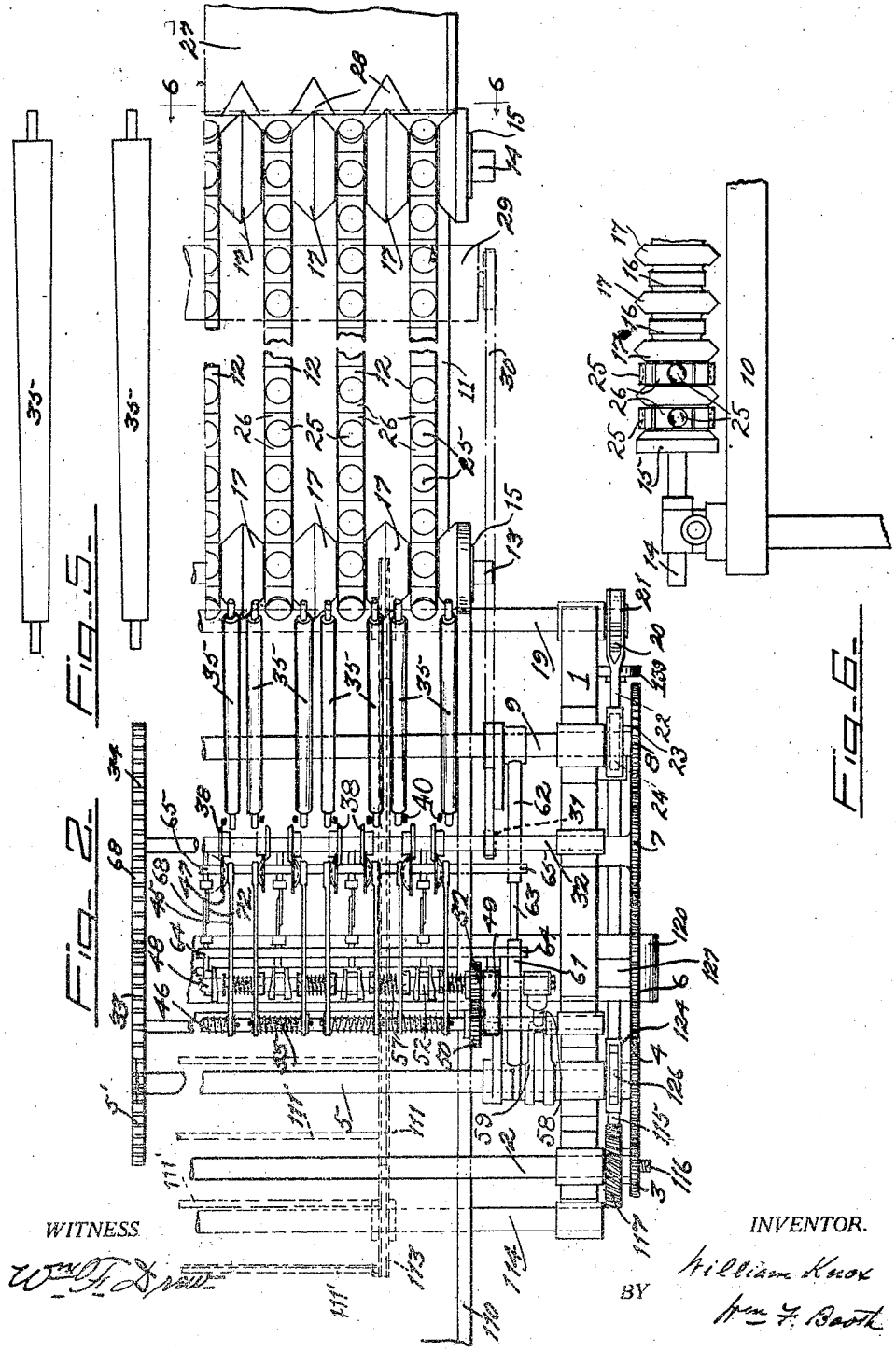

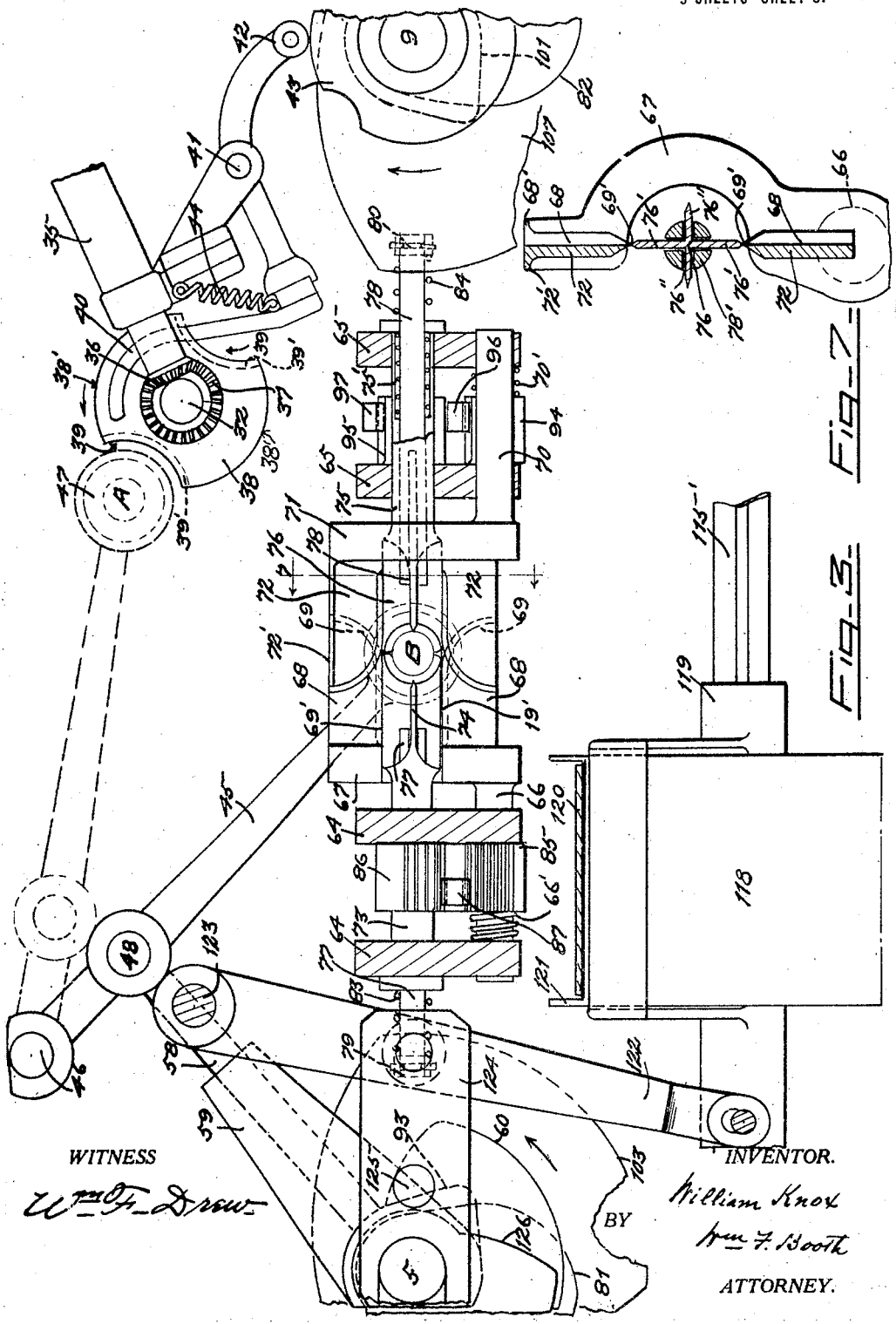

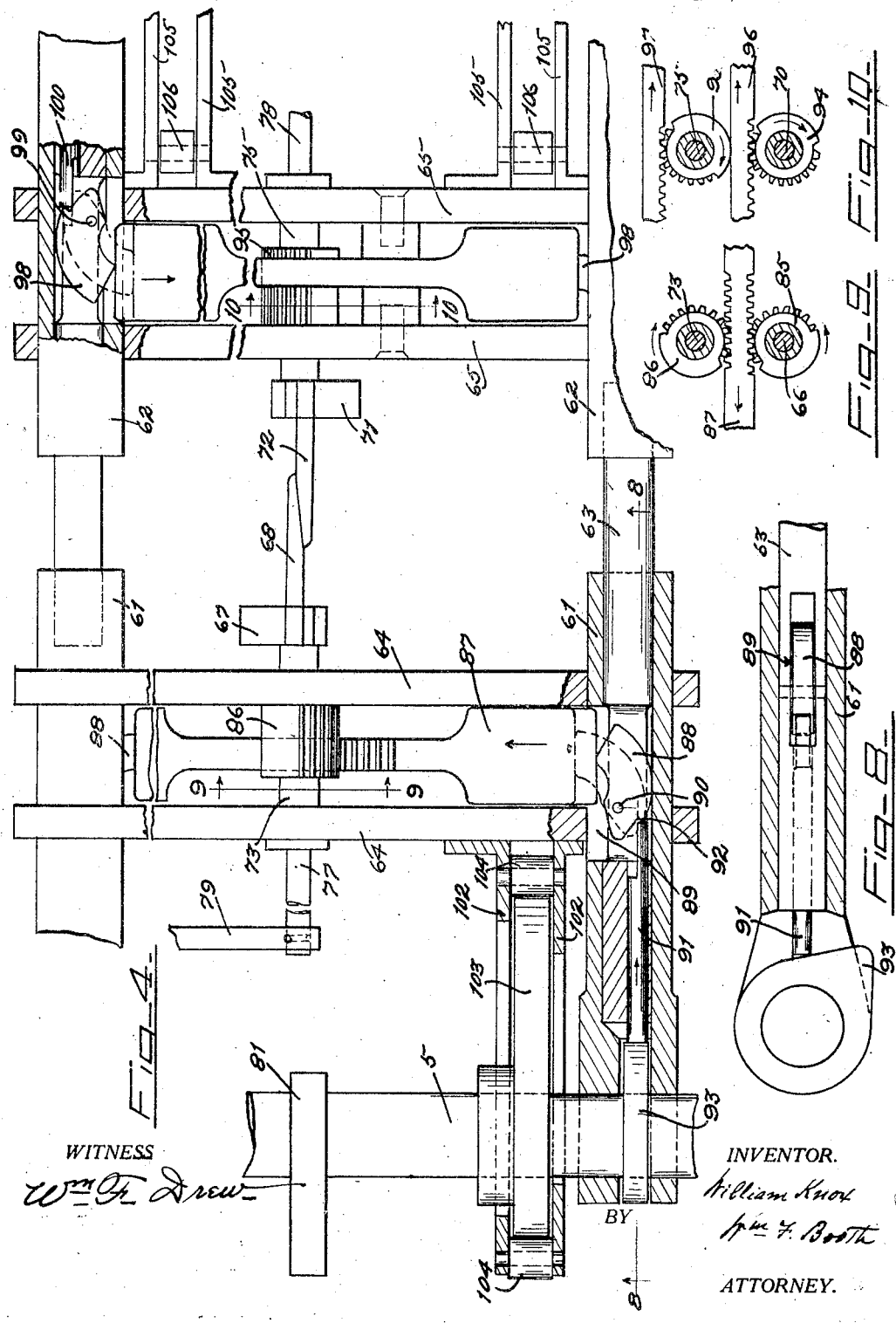

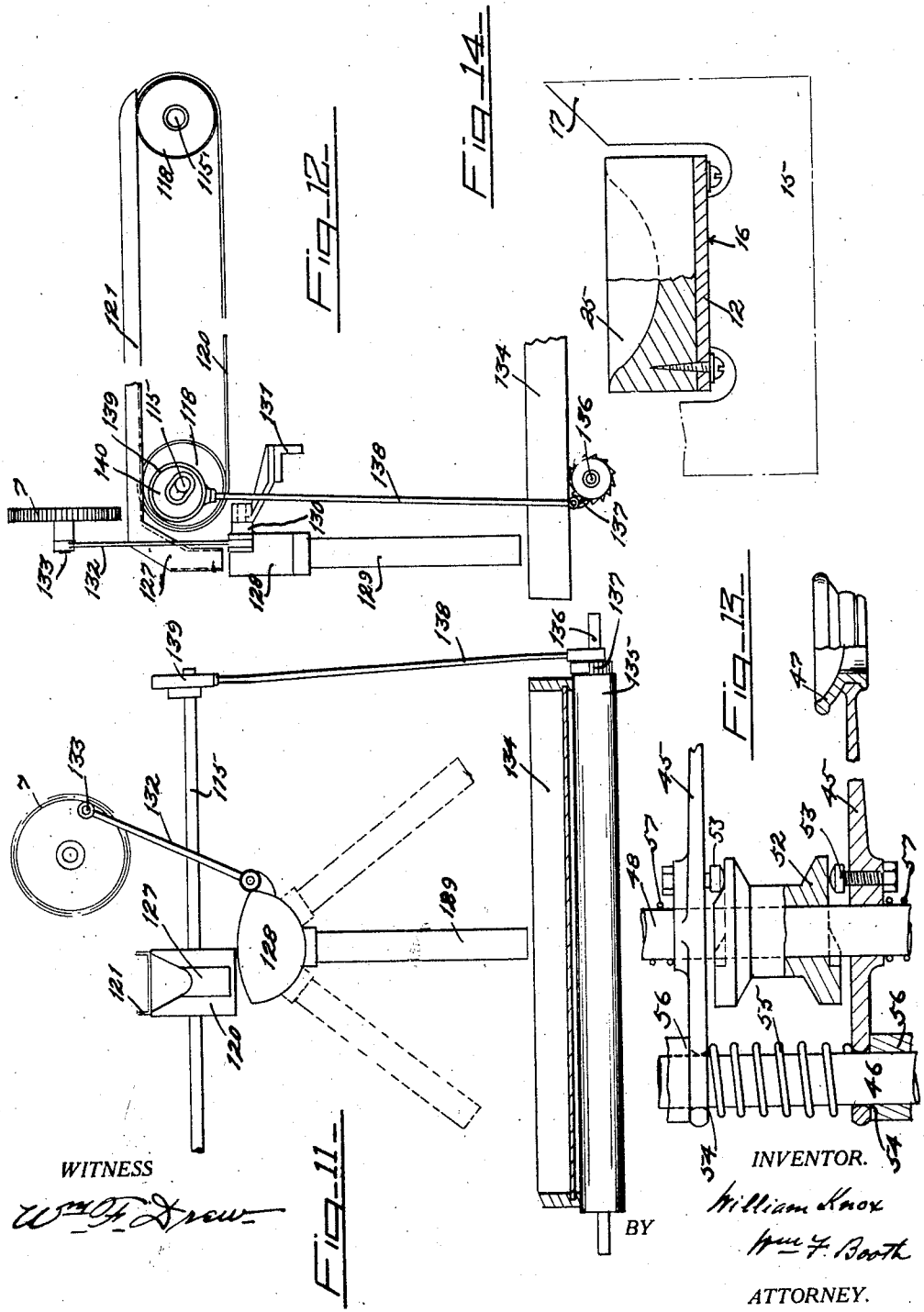

WILLIAM KNOX, OF SAN FRANCISCO, CALIFORNIA.

FRUIT-PITTER.

1,237,528.  Specification of Letters Patent.  Patented Aug. 21, 1917.

Application filed August 26, 1916. Serial No. 117,037.

*To all whom it may concern:*

Be it known that I, WILLIAM KNOX, a citizen of the United States, residing at the city and county of San Francisco and State of California, have invented certain new and useful Improvements in Fruit-Pitters, of which the following is a specification.

My invention relates to a machine for cutting fruit, such as apricots, peaches and the like, and for removing the pits therefrom.

In the cutting and pitting of fruit, such as peaches and apricots, particularly when said fruit is halved, it is highly desirable that the fruit should be cut in the plane of the greatest diameter of the pit, that is on the so-called seam of the fruit. The pit cavity in fruit halved in this manner is relatively shallow, thereby facilitating the subsequent handling of the fruit, especially in the sulfuring, washing and drying thereof, and permitting the easy removal of the pit therefrom.

The object of my invention, therefore, is to provide a machine for cutting such fruits upon the seam and for removing the pits therefrom. A further object of the invention is to eliminate practically all of the hand labor, ordinarily performed, in the cutting and pitting of the fruit, by providing a machine in which the fruit is automatically received and correctly positioned, and is halved and pitted, while so positioned, and in which the cut fruit and the pits are automatically deposited upon suitable conveyers, and thereby discharged from the machine.

In the preferred form of the machine hereinafter described and herewith illustrated, these discharge conveyers comprise trays, of the type usually used for the drying of fruit, and suitable mechanism for advancing the same. The halved fruit is automatically deposited upon the fruit tray in the correct position for drying, that is, cut side up, in such a manner as to completely fill said tray as it is advanced through the machine. The pits are likewise deposited, and spread upon a similar tray, which is also completely filled.

By thus doing away with hand labor, not only is a great saving of time and expense effected, but a product of superior quality, uniformity, and cleanliness is turned out.

To this end my invention consists in the novel machine hereinafter described with reference to the accompanying sheets of drawings, wherein—

Figure 1 is a side elevation of the machine, certain parts being shown in phantom for the sake of clearness.

Fig. 2 is a partly broken plan view of the machine, certain parts being omitted for the sake of clearness.

Fig. 3 is a vertical part-sectional detail, enlarged, of the cutting and pitting knives and the mechanism for positioning the fruit.

Fig. 4 is a part-sectional plan, enlarged, of a portion of the knife operating mechanism.

Fig. 5 is a diagrammatic plan of a pair of the feed rollers.

Fig. 6 is a detailed elevation taken on the line 6—6 of Fig. 2, and viewed in the direction of the arrows.

Fig. 7 is a detailed section through the knives, taken on the line 7—7 of Fig. 3 and viewed in the direction of the arrows.

Fig. 8 is a vertical sectional detail taken on the line 8—8 of Fig. 4, and viewed in the direction of the arrows.

Fig. 9 is a vertical sectional detail taken on the line 9—9 of Fig. 4, and viewed in the direction of the arrows.

Fig. 10 is a vertical sectional detail taken on the line 10—10 of Fig. 4, and viewed in the direction of the arrows.

Fig. 11 is a detailed side elevation of the pit-discharge mechanism, certain parts being omitted.

Fig. 12 is an end elevation of the same.

Fig. 13 is a part-sectional plan detail of a pair of the fruit holding arms.

Fig. 14 is a transverse part-sectional detail of one of the feed belts and a portion of the pulley therefor.

In the drawings, and referring particularly to Fig. 1 thereof, the reference numeral 1 represents the main supporting frame of the machine, in the upper portion of which is journaled a transversely disposed drive-shaft 2, Figs. 1 and 2. A drive pulley indicated in dotted lines at 2' in Fig. 1, is mounted upon one end of said drive shaft 2, and is adapted to receive power from an outside source, not shown in the drawings. On the opposite end of the drive shaft 2 is fixed a gear 3, Figs. 1 and 2 of the drawings, which is adapted to mesh with a similar gear 4, fixed upon the end of a shaft 5 journaled in the frame 1, and disposed parallel to the drive shaft 2. A pair of idler gears 6 and 7 transmit power from said gear 4 to a gear 8, fixed upon the end of the transverse shaft 9 in such manner that said shafts 5 and 9 rotate in unison and in opposite directions.

Positioned adjacent to the main frame 1 is a feeder frame 10, Fig. 1, upon which is mounted an upwardly inclined feed table 11, over which travel a series of parallel spaced feed belts 12. Said feed belts are carried by shafts 13 and 14, upon each of which is mounted a drum 15, having a series of spaced pulley portions 16, Figs. 6 and 14, alternating with a series of spacer portions 17 of larger diameter than said pulley portions. The shaft 13 is intermittently rotated in the direction of the arrow, Fig. 1, by means of sprocket chains 18 connecting said shaft 13 with a parallel shaft 19, carried by the main frame 1, and driven intermittently by means of a ratchet 20 and a pawl 21 carried on the end of a rod 22, and connected with the strap 23 of an eccentric 24, the latter being mounted on the continuously driven shaft 9.

The feed belts 12 carry spaced cups 25, Figs. 1, 2, 6 and 14, alternating with spacer blocks 26, each of said cups 25 being adapted to receive and carry a fruit. The fruit is fed into the machine in any convenient manner. In the drawings I have indicated, at 27, Figs. 1 and 2, a shaker table having baffle plates 28 adapted to direct the fruit from said shaker table onto the cup carrying belts 12. In case the fruit should pile up upon said belts, or become misplaced, a spreader roll 29, Fig. 1, is provided, said roll being positioned transversely, with respect to the belts 12, and elevated thereabove sufficiently to permit the passage thereunder of a single fruit on each belt. Said spreader roll 29 is continuously driven, in the direction of the arrow in Fig. 1, by means of a belt 30 passing over a pulley 31 upon a transverse shaft 32 journaled upon the main frame 1 and driven from the shaft 5 by means of a train of gears 5', 33, and 34. Thus the fruit is spread out upon the belts 12 by means of the spreader roll 29, and is positioned upon the cups 25.

The fruit is carried by said cups 25 and deposited thereby upon downwardly inclined feed rolls 35, Figs. 1, 2 and 5. Said rolls are mounted in pairs, the two rolls of each pair being driven in opposite directions by means of bevel pinions 36, Fig. 3, fixed to the lower ends of said rolls and meshing with similar pinions 37 carried by the shaft 32. The rolls 35 are slightly tapered, as shown in Fig. 5, the surfaces of each pair being slightly farther apart at the lower end than at the upper end. The fruit, thrown onto the upper end of said pairs of rolls 35, rolls down toward the lower end thereof, by gravity, and is agitated during its passage by the opposite rotation of the rolls 35. The result of this action is to cause the fruit to assume a position between said rolls 35 with its greatest diameter lying in a vertical plane. Each pair of rolls 35 is preferably mounted for relative adjustment laterally, to allow the correct spacing thereof to permit the fruit to pass thereover without falling through; said adjustable mounting of the rolls 35 may be of any well known form, and is therefore not shown in the drawings.

Carried by the shaft 32 is a series of disks 38, Figs. 1, 2 and 3, each having a pair of segmental portions removed therefrom, upon opposite sides, as shown at 39 in Fig. 3. Said disks 38 are disposed upon the shaft 32 in pairs, one pair being positioned in relation to and between the lower ends of each pair of feed rolls 35, as seen in Fig. 2. The cut out portions 39 of each pair of disks 38 have inwardly beveled edges 39', thereby forming cups for the reception of the fruit as it leaves the feed rolls 35, said fruit being prevented from leaving said feed rolls, except when said cut out portions 39 pass thereunder, by the solid portions 38' of said disks.

To correctly position the fruit within the cups so formed, I provide a pair of kicker arms 40 positioned immediately outside of the disks 38, that is, between said disks and the lower ends of the feed rolls 35, as shown in Figs. 2 and 3 of the drawings. Said kicker arms 40 are fulcrumed at 41, Fig. 3, and are operated by means of a roller 42 adapted to follow a cam 43 mounted upon the continuously rotating shaft 9, a spring 44 causing said roller 42 to follow the surface of said cam. Said kicker arms 40 are actuated twice during every revolution of shaft 32, and are elevated by the described mechanism to strike the fruit resting within the cups 39 upon its sides, and by so doing, to correctly center said fruit within said cups. Thus the fruit, rolling down the feed rolls 35, is positioned within the cups 39 formed by the disks 38, with its seam in a vertical plane.

The shaft 32 rotates in the direction of the arrow in Fig. 3, and carries the fruit into the position A, between a pair of swinging gripper arms 45. Said arms are fulcrumed upon a transverse shaft 46, and carry at their lower ends flexible cups 47, Figs. 2, 3 and 13, adapted to grip and hold the fruit as it is carried therebetween by the rotation of the shaft 32. Said arms 45 are actuated to grip the fruit by means of a shaft 48, Figs. 2 and 13, said shaft being positioned parallel to the shaft 46 and supported therefrom by means of pivotally mounted links, one of which is shown at 49 in Fig. 2. A pair of intermeshing gears 50 and 51 fixed respectively upon the shafts 46 and 48 impart rotation to said shaft 48, the shaft 46 being rotated by means of the gear 33, Figs. 1 and 2, to which it is fixed. The shaft 48 passes through the arms 45, as shown in Fig. 13, and carries between each pair of said arms a double faced cam 52. Each of the arms 45 carries an adjustable cam follower 53, adapted to engage the face of said cam 52, and by so doing to move said arms 45 laterally to cause the same to be separated or brought together. To permit of this lateral movement, the arms 45 are freely fulcrumed upon the shaft 46, as shown at 54, Fig. 13, and a spring 55 is provided to hold the rear ends of said arms against shoulders 56 upon said shaft 46. Springs 57 are provided upon the shaft 48 to force the forward ends of each pair of arms 45 together as far as the cams 42 will permit.

The shaft 48 carries near each end a pivotally mounted cam following link 58, one of which is shown in Fig. 3 of the drawings. Said link slides within a guide 59 whose lower end embraces and is journaled upon the shaft 5. A cam 60, fixed upon said shaft 5, operates within the guide 59, and bears against the lower end of the link 58. Thus by means of said cams 60 and said links 58, the shaft 48 is moved bodily up and down about the shaft 46 as a center, and this movement of the shaft 48 swings the entire series of fruit carrying arms 45 between the two positions A and B, shown in broken and full lines respectively, in Fig. 3. The action of the parts just described is so timed relative to the rotation of the shaft 32, that each fruit carried by the disks 38 of said shaft 32, is clamped at the position A, Fig. 3, by the inward movement of the arms 45, and is thereafter carried by said arms to the position B.

At the position B, Fig. 3, the fruit correctly positioned and held by the arms 45, is halved and pitted by the following mechanism:—Carried by each end of each of the shafts 5 and 9 are inwardly extending link members 61 and 62, Figs. 2 and 4, the members 61 being carried by the shaft 5, and the members 62 being carried by the shaft 9. The members 61 and 62 are in axial alinement, and are connected by a dowel pin 63, thus forming virtually a continuous connecting bar carried by the ends of said shafts 5 and 9. Mounted for sliding movement in a longitudinal direction upon the members 61 and 62, are two spaced pairs of transverse knife-holding bars 64 and 65, respectively. Each of said pairs of bars 64 and 65 extends across the entire machine, as illustrated in Fig. 2, and supports a set of knives in longitudinal parallelism with each pair of swinging fruit carrying arms 45. All of said knife sets are identical in form and construction, one of said sets being illustrated in detail in Figs. 3 and 4 of the drawings.

Pivotally mounted in the lower portion of the bars 64, Fig. 3, is a longitudinally disposed spindle 66 carrying a curved inwardly extending arm 67, Figs. 3 and 7, and projecting outwardly from said arms 67 is a pair of alined spaced knife-blades 68, said blades being preferably rounded at their ends as shown at 69 and sharpened along said rounded end and the inner edge 69', and having a lateral flange 68' formed along the back of the uppermost blade of the pair. The transverse bars 65 carry a similar pivotally mounted spindle 70 having an upwardly extending curved arm 71, from which project knife blades 72, similar to the blades 68. As shown in the drawings, the blades 68 and 72 overlap and their faces lie against each other. A second pivotally mounted spindle 73 is carried by the bars 64 above and in vertical alinement with the spindle 66, and a similar spindle 75 is similarly carried by the bars 65 in axial alinement with said spindle 73. Said spindles 73 and 75 have formed upon their ends respectively blades 74 and 76 formed in the shape of a cross, as shown in Fig. 7, and having their vertically disposed portions 74' and 76' extended farther than their horizontally disposed portions 74'' and 76'', as shown in Fig. 3, and being sharpened on all exposed edges. The ends of said cross knives 74 and 76 thus form cups adapted, when brought together, to embrace and clamp the pit of the fruit at the position B.

The spindles 73 and 75 are hollow, as shown in Fig. 3, and carry within them slidably mounted ejector rods 77 and 78, respectively. The inner ends 77' and 78' of these rods are cross slotted to pass over the cross-knife blades 74 and 76, as illustrated in Figs. 3 and 7. Said ejector rods 77 and 78 project from the spindles 73 and 75 back of the transverse bars 64 and 65, and their ends are pivotally mounted within transverse rods or bars 79 and 80, respectively, adapted to be engaged by cams 81 and 82, mounted on the respective shafts 5 and 9. Springs 83 and 84 normally hold the ejector rods 77 and 78 in the positions shown in Fig. 3.

Fixed upon the spindles 66 and 73 between the bars 64, are pinions 85 and 86, Figs. 3, 4, 9 and 10, adapted to mesh with a transversely disposed rack 87, slidably carried between said bars 64, as shown in Fig. 4. The end of said rack 87 is adapted to be engaged by a trigger lever 88, Figs. 4 and 8, mounted within an aperture 89 in the longitudinally disposed member 61, and fulcrumed at 90. A slidably mounted pin 91, disposed longitudinally within said member 61, has one of its ends bearing against a shoulder 92 of said trigger 88, and its other end following a cam 93 mounted upon the shaft 5. Thus the action of said cam 93 causes the rack member 87 to be moved transversely within the transverse bars 64, it being understood that a similar cam and trigger lever, not shown in the drawings, are provided at the other end of said rack 87 to move the same in the other direction.

The opposite spindles 70 and 75 carry pinions 94 and 95, respectively, adapted to be engaged by respective transversely disposed rack members 96 and 97, Fig. 10. Said rack members 96 and 97 are actuated by mechanism similar to that described in the preceding paragraph, a portion of which is shown in Fig. 4, as comprising a trigger lever 98 fulcrumed at 99, within the longitudinal member 62, and a slidably mounted pin 100. Said pin 100 bears against a cam, not shown in Fig. 4. It is to be understood, however, that there is a trigger mechanism at each end of the rack members 97 and 98, operated by cams mounted upon the shaft 9, one of which is shown at 101 in Fig. 3.

It will be seen by reference to Figs. 3, 4, 9 and 10 of the drawings, that a transverse movement of the rack member 87 causes the spindle 66 to be rotated to swing the knife blades 68 downwardly and at the same time cause the rotation of the spindle 73, carrying the cross knife blade 74. Parallel and simultaneous movement of the rack members 96 and 97 causes the spindle 70 to be rotated to swing the knife blades 72 downwardly in a direction opposite to the swinging movement of the knife blades 68, and at the same time causes the spindle 75 carrying the cross-knife blade 76 to rotate in the same direction as the spindle 73.

The transverse bars 64 have secured to them a pair of spaced rearwardly extending yoke brackets 102, Fig. 4, between which operates a cam 103 mounted upon the shaft 5. A pair of rollers 104, carried by said brackets 102, follow the surface of said cam 103 and cause the bars 64 to be moved bodily fore and aft. It is understood that a similar pair of brackets and a similar cam, not shown in the drawings, are mounted upon the other side of the machine at the opposite ends of the transverse bars 64. In like manner the transverse bars 65 have rearwardly extending brackets 105 which carry rollers 106 adapted to follow cams, one of which is shown at 107, Fig. 3, mounted upon the shaft 9. As before stated, the cam shafts 5 and 9 rotate continuously in unison and in opposite directions; therefore the movements of the transverse knife bars 64 and 65 occur simultaneously, and are opposite in direction.

The fruit, as previously described, is positioned between the cups 47 of the swinging arms 45 at the position B, Fig. 3, with the seam or greater diameter of said fruit lying in a vertical plane, and in vertical alinement with the knives 68 and 72.

During this positioning of the fruit, the transverse bars 64 and 65, carrying the knives, have been separated by their respective cams 103 and 107, so that the fruit may be carried into said position B by the arms 45 without interfering with said knives. Immediately after the fruit has been so positioned, the bars 64 and 65 are brought together by their respective cams, causing the knife blades 68 and 72 to enter the fruit, in a vertical plane. The pit of the fruit lies between the spaced arms of said knife blades 68 and 72, and is clamped between the cross knife blades 74 and 76, which also enter the fruit for this purpose.

To allow for inequalities of size in the pit, the spindles 73 and 75 carrying said cross knife blades 74 and 76, are backed by compression springs, one of which is shown at 75'. Similar springs 66' and 70' are provided upon the knife spindles 66 and 70 respectively, to allow the knives 68 and 72 to give slightly in the event of one or both striking the pit. The swinging arms 45 are now separated laterally to free the fruit, and returned to the position A, Fig. 3, by the cam 60. The fruit is thus held by the knives 68 and 72, which have bisected it, and the pit is held clamped between the cross knives 74 and 76. The transverse rack members 87, 96, and 97 are then actuated by their respective cams 93 and 101, causing the knife blades 68 and 72 to swing outwardly and downwardly in opposite directions, thereby separating the two halves of the bisected fruit and freeing the same from the pit, the flanges 68' and 72' at the upper edges of said knife blades serving to properly guide the bisected fruit. At the same time, the cross blades 74 and 76 are rotated in the same direction to assist in the freeing of said pit.

The two halves of the fruit fall away from the knife blades 68 and 72, and drop upon a tray 110, Figs. 1 and 2. Said tray is carried by a traveling belt conveyer, comprising two spaced parallel chains 111, running over sprockets 112 and 113, mounted upon the shaft 19 and a shaft 114, respectively, and carrying transverse connecting bars 111'. Said conveyer, therefore, moves intermittently, driven by the intermittent rotation of the shaft 19, and carries the tray 110 forward, in the direction of the arrow by a series of intermittent movements, the movement of each step being approximately equal to the diameter of the fruit. The halved fruit is thus deposited, cut side up, in transverse rows upon the tray, said tray being completely filled in its passage through the machine. The empty trays may be placed upon the conveyer 111, and the filled trays removed therefrom by any means, not shown in the drawings.

Immediately after the removal of the halved fruit from the knives 68 and 72, the transverse knife carrying bars 64 and 65 are separated by their respective cams 103 and 107, and the pit, which up to this time has been held between the cross knives 74 and 76, is freed. At the same time the ejector rods 77 and 78 are held against outward movement by the respective cams 81 and 82, so that as said cross knives 74 and 76 are withdrawn, the inner end 77' and 78' of said ejector rods are forced out over said cross knives 74 and 76 to remove the pit therefrom, in case it should cling to one or the other of said knives.

On each side of the machine is mounted a longitudinally disposed shaft shown at 115 and 115' respectively, in Figs. 1, 4, 11 and 12, said shafts being rotated by a helical gear, one of which is shown at 116, Fig. 1, which meshes with and is driven by a similar gear 117, mounted upon the drive shaft 2. The shafts 115 and 115' are splined, as seen in Fig. 3, and carry slidably mounted conveyer belt pulleys 118, Fig. 12, mounted within sliding brackets, one being shown at 119, Fig. 3. A conveyer belt 120 operates over said pulleys 118 and has its upper run lying within a trough 121. The bracket 119, Fig. 3, has connected thereto a lever 122, fulcrumed at 123 and connected, by means of a link 124, with a cam follower 125 adapted to follow a cam 126 mounted upon the shaft 5. It is to be understood that the brackets 119, upon both sides of the machine, are similar, and are connected, by similar mechanism, with similar cams, mounted upon both ends of the shaft 5, so that by the rotation of said shaft 5, the conveyer trough 121 and the conveyer belt 120 are moved bodily fore and aft.

During the removal of the halved fruit from the knives 68 and 72, and the dropping thereof into the fruit tray 110, the conveyer belt 120 occupies the position shown in Fig. 3. Immediately after said removal of the halved fruit, and previous to the described release of the pit from the cross knives 74 and 76, the conveyer belt 120 is moved into a position, not shown in the drawings, beneath said pit. The pit therefore drops, when released, upon the conveyer belt 120 and is carried thereby into a discharge chute 127, Figs. 11 and 12, by which it is conveyed into a movable hopper 128 having a downwardly extending spout 129. Said hopper is fulcrumed at 130, Fig. 12, upon a fixed bracket 131, and is swung from side to side by a connecting link 132, pivotally connected to a crank pin 133 carried by the idler gear 7.

Beneath the swinging hopper spout 129 is positioned a tray 134, Figs. 1, 11 and 12, said tray resting upon conveyer rollers, one of which is shown at 135. Said roller is carried upon a shaft 136 and is intermittently rotated to move the tray 134 slowly across the machine, beneath the hopper spout 129, by means of a pawl and ratchet mechanism 137 operated by a connecting rod 138, whose upper end is fixed to a strap 139 surrounding an eccentric 140, carried upon the end of the longitudinal shaft 115. Thus the released pits, falling through the hopper spout 129, are spread or scattered upon the pit tray 134, as the same is slowly advanced through the machine. Said tray may be removed, when full, by any convenient means, not shown in the drawings, and an empty tray substituted therefor.

It is to be understood that the machine may have as many sets of knives as is convenient or desirable, it being preferable to have a sufficient number of sets of knives to cut, at each stroke, a sufficient quantity of fruit to make one complete row transversely across the tray. There is one feed belt 12, one pair of feed rolls 35, one pair of cupped feed disks upon the shaft 32, and one pair of swinging fruit holding arms 45 for each knife set. All of said sets of mechanism work simultaneously, so that one fruit is acted upon in each set of knives. All of the fruit halved and pitted at each operation is simultaneously deposited upon the fruit tray 110, and all of the pits are simultaneously dropped onto the conveyer belt 120 and removed thereby through the hopper 128 and the spout 129 to the pit tray 134.

The operation of the machine may be briefly summarized as follows, the course of one fruit through the machine being traced in all its steps. The fruit, passing from the shaker table 27, Figs. 1 and 2, is deposited within one of the cups 25 of one of the feed belts 12, and is carried thereby to the upper end of the pair of spaced feed rolls 35 in alinement therewith. Said fruit then rolls down upon said feed rolls, assuming a position with its greatest diameter or seam lying in a vertical plane. At the lower end of said feed rolls 35, the fruit is picked up by the cupped disks 38, and is correctly centered thereon, by the kicker arms 40, Figs. 2 and 3.

The operating mechanism is so timed that the feed belt 12 delivers one fruit to the upper end of the rolls 35 for every fruit removed from the lower end thereof by the cupped disks 38. The rolls 35, however, are preferably kept full, that is, with a solid line of fruit from end to end thereof, so that there will be no interruption in the fruit fed to the knives, even though an occasional cup 25 of the feed belt 12 fails to pick up a fruit from the shaker table 27. The supply of fruit on the rolls 35 is replenished, when it becomes exhausted on account of a succession of missed feed cups 25, by direct hand feeding by the operator.

Said cupped disks 38 transfer the fruit to the position A, Fig. 3, where it is gripped by the flexible cups 47 of the swinging arms 45, and is carried thereby to the position B, Fig. 3, with its seam still lying in a vertical plane. The fruit is then halved by the knives 68 and 72 in the plane of its seam, and is held by said knives and the cross knives 74 and 76, while the swinging arms 45 are laterally separated and returned to their former position. The knives 68 and 72, Figs. 3 and 7, then separate, swinging outwardly and downwardly, and throw the bisected fruit upon the fruit tray 110, Fig. 1. The pit conveyer 120 then moves into a position beneath said knives and catches the pit, when the same is released by the separation of said knives. From the conveyer belt 120, the pit is dropped through the swinging hopper and spout 128 and 129 onto the pit tray 134.

Thus the fruit is halved in the plane of its seam or greatest diameter, and is automatically deposited upon a tray in preparation for drying or any other desired operation, and the pits are automatically deposited upon a separate tray upon which they also may be dried, or otherwise treated. Moreover, the operation of the machine is continuous; fruit is fed into the machine from the shaker table; empty trays are successively placed upon the tray conveyers and the filled trays are successively removed therefrom.

I claim:—

1. A machine for the described purpose, comprising means for receiving and holding the fruit to be cut, a movable conveyer belt for feeding said fruit to said receiving and holding means, a rotating spreader roll spaced above said conveyer belt for distributing and positioning the fruit thereupon, and means for halving the fruit and separating the pit therefrom.

2. A machine for the described purpose, comprising means for receiving and holding the fruit to be cut, a conveyer belt for feeding said fruit to said receiving and holding means, said belt having a series of fruit holding cups mounted thereon, means for halving the fruit in the plane of its greatest diameter, and means for separating the pit from the halved fruit.

3. A machine for the described purpose, comprising means for receiving and holding the fruit to be cut, a conveyer belt for feeding said fruit to said receiving and holding means, said belt being provided with a series of fruit holding cups, devices for positioning the fruit within said cups, means for halving the fruit in the plane of its greatest diameter while held by said receiving and holding means, and means for separating the pit from the halved fruit.

4. A machine for the described purpose, comprising means for receiving and holding the fruit to be cut, a conveyer belt for feeding said fruit to said receiving and holding means, said belt having a series of fruit holding cups mounted thereon, a rotating spreader roll spaced above said belt for positioning the fruit within said cups, and means for cutting the fruit while held by said receiving and holding means.

5. A machine for the described purpose, comprising means for receiving and holding the fruit to be cut, a plurality of parallel conveyer belts for feeding said fruit to said receiving and holding means, each belt having a series of fruit holding cups mounted thereon, means common to all of said belts for supplying the fruit thereto, a rotating spreader roll disposed transversely above said belts for positioning the fruit within said cups, and means for halving the fruit and separating the pits therefrom.

6. A machine for the described purpose, comprising means for receiving and holding the fruit to be cut, a pair of spaced downwardly inclined rolls adapted to convey the fruit to said receiving and holding means, the space between said rolls being greater at their lower ends than at their upper ends, means for halving the fruit in the plane of its greatest diameter, and means for separating the pit from the halved fruit.

7. A machine for the described purpose, comprising means for receiving and holding the fruit to be cut, a pair of spaced downwardly inclined tapering rolls adapted to convey the fruit to said receiving and holding means, mechanism for rotating said rolls in opposite directions, and means for cutting the fruit held by said receiving and holding means.

8. A machine for the described purpose, comprising means for receiving and holding the fruit to be cut, a pair of spaced downwardly inclined rolls for positioning the fruit with its greatest diameter in a vertical plane, devices for transferring said fruit from said rolls to said receiving and holding means, and means for cutting the fruit, while held by said receiving and holding means, in the plane of its greatest diameter, and for removing the pit therefrom.

9. A machine for the described purpose, comprising means for receiving and holding the fruit to be cut, means for positioning the fruit with its greatest diameter in a given plane, devices for transferring the fruit from said positioning means to said receiving and holding means, means for cutting the fruit, while held by said receiving and holding means, in the plane of its greatest diameter, and mechanism for operating said transferring devices, said receiving and holding means, and said cutting means in timed relation.

10. A machine for the described purpose, comprising means for halving the fruit in the plane of its greatest diameter and for removing the pit therefrom, a pair of movable gripper arms adapted to received the fruit and position the same within the sphere of action of said halving means, and means for feeding the fruit to said gripper arms.

11. A machine for the described purpose, comprising means for halving the fruit in the plane of its greatest diameter, a pair of swinging gripper arms adapted to receive said fruit and position the same within the sphere of action of said halving means, and means for feeding the fruit to said gripper arms.

12. A machine for the described purpose, comprising means for cutting the fruit and removing the pit therefrom, a pair of swinging gripper arms, provided with flexible fruit holding members, adapted to receive the fruit and position the same within the sphere of action of said cutting means, and means for feeding the fruit to said gripper arms.

13. A machine for the described purpose, comprising means for positioning the fruit to be cut, means for discharging the cut portions of said fruit, devices for entering the fruit and holding the pit therein, a pair of cutting knives adapted to cut the fruit, and means for moving said cutting knives laterally to separate the cut portions of the fruit from the held pit and to deposit the same, with the cut side uppermost, upon said discharging means.

14. A machine for the described purpose, comprising means for positioning the fruit to be cut, means for discharging the cut portions of the fruit, devices for entering the fruit and holding the pit therein, a pair of cutting knives adapted to halve the fruit in a vertical plane, and means for moving said cutting knives laterally to separate the halves of the fruit from the pit, and to deposit the same, in a horizontal position with the cut side uppermost, upon said discharging means.

15. A machine for the described purpose, comprising means for positioning the fruit to be cut, means for discharging the cut portions of the fruit, devices for entering the fruit and holding the pit therein, a pair of cutting knives adapted to halve the fruit in a vertical plane, means for moving said cutting knives laterally to separate the halves of the fruit from the held fruit, and to deposit the same upon said discharging means, and outwardly projecting lips formed upon the upper edges of said cutting knives for guiding the halves of the fruit into position upon said discharging means.

16. A machine for the described purpose, comprising means for positioning and holding the fruit to be cut, devices for entering the fruit and holding the pit therein, means coacting therewith for cutting the fruit and separating the cut portions thereof from said pit, and means associated with said pit-holding devices for removing the pit therefrom after the separation of said fruit from said pit.

17. A machine for the described purpose, comprising means for positioning and holding the fruit to be cut, a pair of oppositely operating devices for entering the fruit and holding the pit therein, means coacting therewith for cutting the fruit and separating the cut portions thereof from said pit, and means carried by said pit-holding devices for removing the pit therefrom after the separation of said fruit from said pit.

18. A machine for the described purpose, comprising means for positioning the fruit to be cut, devices for entering the fruit and holding the pit therein, means coacting therewith for cutting the fruit, and mechanism for operating said cutting means independently of said pit holding devices, to cause the cut portions of the fruit to be separated from the pit.

19. A machine for the described purpose, comprising means for positioning the fruit to be cut, devices for entering the fruit and holding the pit therein, means coacting therewith for cutting the fruit, and mechanism for moving said pit holding devices and said cutting means independently, to cause the cut portions of the fruit to be separated from the pit.

20. A machine for the described purpose, comprising means for positioning the fruit to be cut, a pair of oppositely operating knives, adapted to enter the fruit and to hold the pit therein, means for cutting the fruit and for removing the cut portions thereof, and means for rotating said pit holding knives to separate said pit from the cut portions of the fruit.

21. A machine for the described purpose, comprising means for positioning the fruit to be cut, a pair of oppositely operating knives adapted to enter said fruit and to hold the pit therein, a pair of co-acting knives adapted to cut the fruit, and mechanism for moving said cutting knives laterally in opposite directions to separate the cut portions of said fruit and free the same from said pit.

22. A machine for the described purpose, comprising means for positioning the fruit to be cut, a pair of oppositely operating knives adapted to enter the fruit and to hold the pit therein, a pair of co-acting cutting knives adapted to cut said fruit, mechanism for swinging said cutting knives in opposite directions to separate the cut portions of said fruit from said pit, and mechanism for simultaneously rotating said pit holding knives to assist the separation of said pit.

23. A machine for the described purpose, comprising means for positioning the fruit to be cut, a pair of oppositely operating knives adapted to enter said fruit and to hold the pit therein, a pair of oppositely operating cutting knives, associated with said pit holding knives, for cutting said fruit, devices for imparting reciprocating motion to said knives, and mechanism for rotating said pit holding knives and for simultaneously moving said cutting knives laterally to separate the cut portions of the fruit from the pit.

24. A machine for the described purpose, comprising means for holding and positioning the fruit to be cut, means for entering said fruit and holding the pit therein, means for halving said fruit in the plane of its greatest diameter and for removing the halves thereof from said pit, means for discharging the halved fruit, and devices associated with said halving means for depositing the halved fruit upon said discharging means.

25. A machine for the described purpose, comprising means for positioning and holding the fruit to be cut, means for entering said fruit and holding the pit therein, means for halving said fruit in the plane of its greatest diameter, conveying means for carrying the cut fruit out of the machine, and means for separating the halves of said fruit from said pit and depositing the same upon said conveying means.

26. A machine for the described purpose, comprising means for positioning and holding the fruit to be cut, devices for cutting said fruit and separating the cut portions thereof from the pit, a traveling conveyer for receiving the pits from said cutting and separating devices, a tray adapted to receive said pits, a swinging hopper for receiving said pits from said conveyer and distributing the same upon said tray, and mechanism for advancing said tray beneath said hopper.

27. A machine for the described purpose, comprising means for holding and positioning the fruit to be cut, a pair of oppositely operating knives adapted to enter said fruit and to hold the pit therein, mechanism for actuating said knives to cause them to grip and release said pit, a pair of co-acting knives associated with said pit holding knives for cutting said fruit and removing the cut portions thereof from said pit, means for receiving and discharging the cut portions of the fruit prior to the release of said pit by said pit-holding knives, and a movable conveyer adapted to be positioned beneath said knives, after the removal of the cut portions of the fruit, for receiving and discharging the pit.

28. A machine for the described purpose, comprising a pair of swinging arms adapted to hold and position the fruit to be cut, means for feeding said fruit to said arms, a pair of oppositely operating knives adapted to enter the fruit and to hold the pit therein, a pair of cutting knives associated with said pit-holding knives for cutting the fruit, means for moving said cutting knives laterally to separate the cut portions of said fruit from said pit, and means for separately discharging the cut portions of the fruit and the pit.

29. A machine for the described purpose, comprising means for receiving the fruit to be cut and positioning the same with its greatest diameter in a given plane, a pair of swinging arms for holding said fruit in said position, a pair of oppositely operating knives adapted to enter the fruit and to hold the pit therein, a pair of cutting knives associated with said pit-holding knives for cutting the fruit in said plane of its greatest diameter, mechanism for moving said cutting knives laterally and for simultaneously rotating said pit-holding knives to separate the cut portions of the fruit from the pit, and means for separately discharging said cut portions of the fruit and said pit.

30. A machine for the described purpose, comprising a plurality of pairs of swinging gripper arms adapted to receive and hold the fruit to be cut, devices for simultaneously feeding a fruit to each of said pairs of arms, a plurality of oppositely operating pairs of knives adapted to enter the fruit and to hold the pits therein, a plurality of cutting knives associated with said pit holding knives for cutting said fruit and for removing the cut portions thereof from said pits, and devices common to all of said knives for separately discharging the cut portions of the fruit and the pits.

31. A machine for the described purpose, comprising a plurality of simultaneously operating pairs of swinging gripper arms adapted to receive and hold the fruit to be cut, devices for simultaneously feeding a fruit to each of said pairs of arms, a pair of knives associated with each pair of gripper arms for entering the fruit and holding the pit therein, a second pair of knives associated with said pit-holding knives for halving the fruit and separating the halves thereof from the held pit, movable discharging means for receiving the halves of said fruit from all of said cutting knives and conveying the same out of the machine, a second movable discharging means for receiving the pits from said pit-holding knives and conveying the same out of the machine, devices for removing said pits from said pit-holding knives, means for distributing said pits upon said second discharging means, and mechanism for operating all of said parts in timed relation.

In testimony whereof I have signed my name to this specification in the presence of two subscribing witnesses.

WILLIAM KNOX.

Witnesses:
 WM. F. BOOTH,
 D. B. RICHARDS.